United States Patent

Hammer

[15] 3,646,906
[45] Mar. 7, 1972

[54] PRESSURE INDICATOR AND SURGE CONTROL DEVICE

[72] Inventor: Kurt F. Hammer, Camarillo, Calif.
[73] Assignee: Purolator Products, Inc., Rahway, N.J.
[22] Filed: Feb. 1, 1968
[21] Appl. No.: 702,442

[52] U.S. Cl. .................................................116/70, 210/90
[51] Int. Cl. ...........................................................G01l 19/12
[58] Field of Search ..................116/70, 117; 137/599, 153, 137/557, 152, 517, 467; 73/419, 388, 396, 389; 138/37, 40, 42, 43, 44, 45, 46; 210/85, 90

[56] References Cited

UNITED STATES PATENTS

| 3,547,069 | 12/1970 | Tao | 116/70 |
|---|---|---|---|
| 1,087,883 | 2/1914 | Loomis | 73/392 |
| 2,897,675 | 8/1959 | Kucher et al. | 73/420 |
| 3,270,884 | 9/1966 | Bremer | 210/90 |
| 3,495,566 | 2/1970 | Pall | 116/70 |
| 1,096,431 | 5/1914 | Kepple | 116/70 UX |
| 2,041,198 | 5/1936 | McLean | 116/70 UX |
| 2,179,144 | 11/1939 | Buttner | 116/70 UX |
| 2,833,311 | 5/1958 | Baldelli | 138/43 |
| 2,843,077 | 7/1958 | Leefer | 116/117 |
| 3,036,592 | 5/1962 | Lips | 137/467 |
| 3,091,213 | 5/1963 | Maskell et al. | 116/70 |
| 3,154,049 | 10/1964 | Smith et al. | 116/70 |
| 3,212,471 | 10/1965 | Willis | 116/70 |
| 3,335,863 | 8/1967 | Silverwater | 210/90 |
| 3,366,758 | 1/1968 | Bentzen et al. | 116/70 UX |
| 3,413,951 | 12/1968 | Keil et al. | 116/70 |
| 3,477,464 | 11/1969 | Ryan | 73/392 X |

*Primary Examiner*—Louis J. Capozi
*Attorney*—Smyth, Roston & Pavitt

[57] ABSTRACT

This disclosure describes a pressure indicator of the type having a pressure-responsive member which is exposed to relatively high-pressure and relatively low-pressure fluid. A surge control device is interposed in the high-pressure line upstream of the fluid-responsive member to interpose a time delay for actuation of the indicator which is sufficient to cancel out the effect of pressure surges. The surge control device includes means for restricting the flow of fluid to the pressure responsive member to thereby achieve the necessary time delay.

9 Claims, 8 Drawing Figures

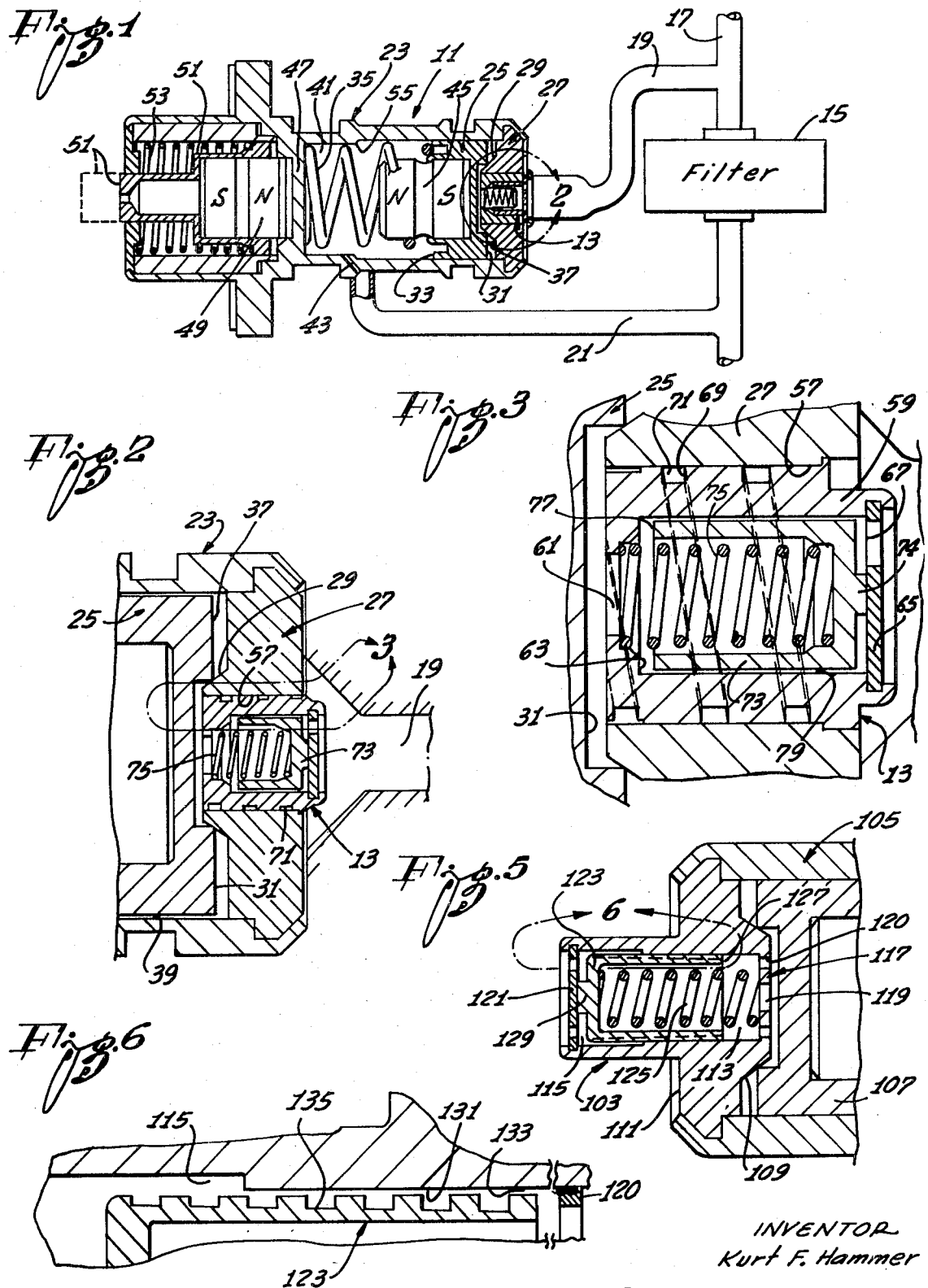

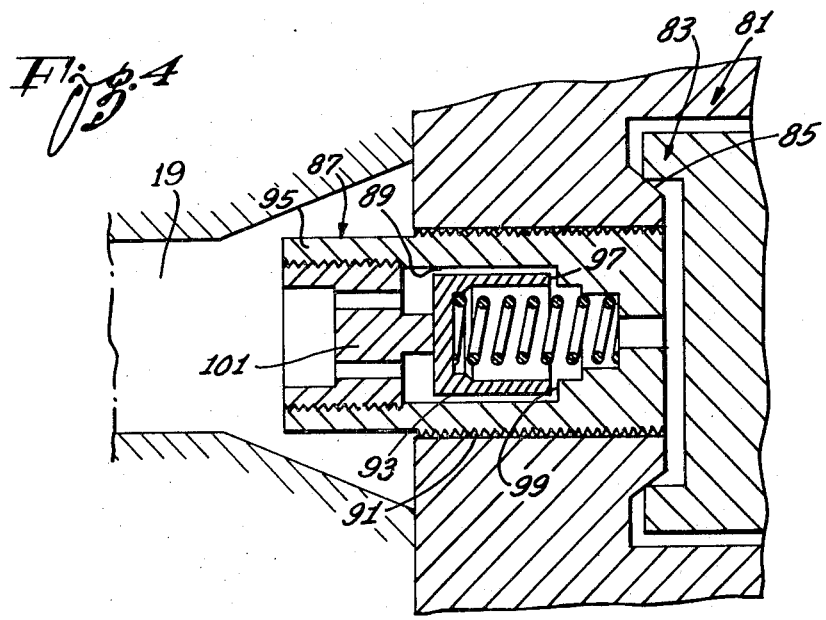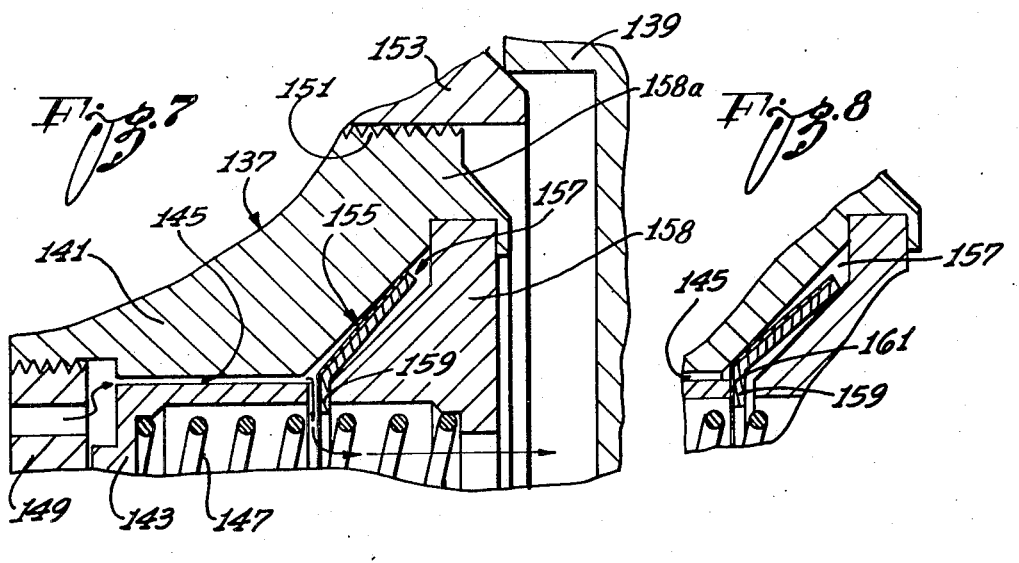

PRESSURE INDICATOR AND SURGE CONTROL DEVICE

BACKGROUND OF THE INVENTION

Pressure indicators are used in fluid systems to provide a signal when pressure conditions within the system reach a predetermined level. Pressure indicators are often made to be responsive to pressure differentials and to provide a signal when the pressure differential reaches a predetermined magnitude. For example, it may be necessary or desirable to be advised when the pressure drop across a component of a fluid system, such as a filter, reaches a predetermined magnitude because such pressure drop is an indication of the need to clean or replace the filter. In this instance, the pressure indicator, when actuated by the necessary pressure drop across the filter, may provide an audible or visible signal thereby indicating the need to clean or replace the filter.

It is inherent in many fluid systems that pressure surges will occur. Often, these pressure surges are of sufficient magnitude to create a pressure drop or differential of considerable magnitude well above the normal actuation pressure differential for the indicator. In the case of a filter, such surges are not indicative of a dirty or clogged filter, and therefore, if the indicator responds to such surges, a false signal would be provided thereby. For this reason, it is often necessary or desirable to employ a surge control device whose general function is to prevent the indicator from "seeing," or actuating in response to, these pressure surges.

An important characteristic of pressure surges is that they are of relatively short duration, and this distinguishes them from the normal pressure differential across a filter which would normally increase gradually as the filter becomes increasingly dirty or clogged. Accordingly, one way of effectively cancelling out the pressure surges, so far as the indicator is concerned, is to provide a surge control device which prevents the indicator from actuating immediately upon the occurrence of the requisite pressure differential. Rather the surge control device interposes a time delay of sufficient duration to allow the momentary surge condition to subside. Heretofore, such time delay devices have not been as effective as desired. These prior art time delay devices, once actuated at a given pressure differential, do not permit return of the indicator to its normal nonindicating position for an undesirably long period of time or until the pressure differential is reduced drastically. In addition, the duration and magnitude of the pressure surges generally increase with a decrease in temperature of the fluid in the system, and prior art devices have not been as effective as desired in coping with this problem.

SUMMARY OF THE INVENTION

The present invention overcomes the disadvantages of prior art devices and provides an improved surge control device by restricting the flow of fluid from the high-pressure side of the filter, or other fluid component, to the indicator when the pressure differential across the component increases to a magnitude which is a predetermined amount greater than the required actuation pressure differential for actuating the indicator. With this arrangement, the normal relatively slow increase in pressure differential across the fluid component, will, when it reaches the actuation level, actuate the indicator after a predetermined short time delay without bringing the surge control device into operation. If, however, a pressure surge occurs which creates a pressure differential across the component which is a predetermined amount greater than the actuation pressure differential, the surge control device operates to restrict fluid flow to the indicator. As the indicator is actuated in response to the flow of fluid thereto and the surge control device restricts such flow, the actuation of the indicator is delayed sufficiently to permit the surge pressure to drop below the actuation pressure differential.

The surge control device of this invention is capable of operation with an indicator having a pressure responsive member exposable to different pressures on different sides thereof. In a preferred form of the invention, the pressure indicator provides a leakage passage from the high pressure to the low pressure side of the pressure responsive member and the pressure responsive member is movable at a reduced rate of speed from a first position to a second or indicating position in response to the existence of a predetermined pressure differential, or actuation pressure differential, across the filter which remains for a predetermined period of time.

The present invention teaches that the fluid flow can be advantageously restricted by utilizing two capillaries of small cross sectional area and closing off one of these capillaries when a pressure surge of predetermined magnitude occurs. A capillary or passageway of considerable length relative to its diameter is better than a simple orifice restriction because with the latter a very small opening must be used in order to provide the necessary time delay and such small orifice opening is subject to clogging. Also a small orifice, which is sufficiently small to provide the necessary delay for surge conditions, may provide a prohibitively long delay at normal actuation pressures. A capillary on the other hand need not be of such small cross-sectional area because the length of the capillary interposes some additional restriction to the flow of fluid therethrough.

Because of the problems inherent in trying to reduce a single capillary in cross section throughout its length in response to surge conditions, it is preferred to use two capillaries and to shut off one of the capillaries when surge conditions occur. For many applications, the capillary which is closed in response to a surge condition is significantly larger in cross-sectional area than the capillary which remains open. According to one embodiment of the invention, the two capillaries are completely separate passages through the surge control device and one of these capillaries is immediately completely shut down as by a valve member when predetermined surge conditions occur. To further increase the restriction provided by the capillary which remains open, such capillary is preferably of considerable length relative to the length of the surge control device and may be of greater length than the first capillary. To accomplish this the capillary may be defined by an axially and circumferentially extending groove in the exterior surface of the surge control device.

When operating with both of the capillaries open, the surge control device provides a restriction which gives a relatively short time delay to actuate the indicator when the actuation pressure differential occurs. However, when surge conditions do occur, one of the capillaries and preferably the larger of the two, is closed to further restrict the flow of fluid to the indicator and thereby change the rate of delay of actuating the indicator. Such rate of delay is sufficient to permit the surge conditions to subside without actuating the indicator.

The present invention teaches that a still longer time delay may be obtained by progressively increasing the restriction to fluid flow through the capillaries prior to partially closing or completely shutting down one of the capillaries. This form of the invention provides a continuous rate of change of the restriction to fluid flow and therefore a continuous rate of change of the time delay. With this form of the invention, the cross sectional area of at least the inlet portion of one of the capillaries is progressively reduced as the surge conditions progressively increase. In addition, both of the capillaries are increased in length as the surge conditions increase. Finally, one of the two capillaries is substantially completely closed as in the above-described embodiment of the invention and the other capillary is partially closed.

Another feature of this invention is that at least one of the capillaries is defined by two relatively movable surfaces. The relative movement between the surfaces operates as a self-cleaning mechanism which prevents clogging of the capillary. This feature can be conveniently provided in a surge control device in which one or both of the capillaries are defined by the space between a movable valve member and a surrounding body portion of the device.

As the temperature of the fluid within the system decreases, it becomes more viscous, and therefore, when surges occur, they occur for a greater period of time and have greater magnitude. It is necessary therefore to either increase the time delay for actuating the indicator when the temperature of the fluid in the system is reduced or to prevent actuation of the indicator when the temperature of the fluid is below a given value. As the fluid in the system is usually cold only for a relatively short period following start up of the system, a temperature compensator which prevents indicator actuation during this period is acceptable. The present invention accomplishes this desirable result by providing a valve seat which is movable in response to a predetermined decrease in the temperature of the fluid to close the larger capillary independently of the system pressure. With only the smaller capillary open at the outset, a pressure surge would not actuate the indicator.

The invention, both as to its organization and method of operation together with further features and advantages thereof may best be understood by reference to the following description taken in connection with the accompanying illustrative drawing.

BRIEF DESCRIPTION OF THE DRAWINGS

FIG. 1 is a sectional view through one form of pressure indicator and surge control device with connections to a fluid system being illustrated diagrammatically.

FIG. 2 is an enlarged sectional view of the surge control device and a portion of the pressure indicator as indicated by the arrows in FIG. 1.

FIG. 3 is an enlarged sectional view of the surge control device and of fragments of the pressure indicator.

FIG. 4 is a sectional view similar to FIG. 2 illustrating a second form of surge control device.

FIG. 5 is a sectional view similar to FIG. 2 showing a third form of surge control device which produces an increased time delay for actuating the indicator.

FIG. 6 is an enlarged fragmentary sectional view showing the region of the surge control device generally indicated by the arrows in FIG. 5.

FIG. 7 is a fragmentary sectional view of a surge control device similar to that shown in FIGS. 1–3 having temperature compensating means provided therein.

FIG. 8 is a fragmentary sectional view of a portion of the surge control device shown in FIG. 7 with the temperature compensator having been actuated to close one of the capillaries.

DESCRIPTION OF THE PREFERRED EMBODIMENTS

Referring to the drawings and in particular to FIG. 1 thereof, there is illustrated a pressure indicator device 11 and a surge control device 13. The indicator device 11 and the surge control device 13 are connected across a component of a fluid system such as a filter 15. The filter 15 is supplied with fluid via a supply conduit 17 and as the filter becomes dirty, the pressure drop thereacross will increase. The indicator device 11 is connected to the high-pressure and low-pressure sides of the filter 15 by conduits 19 and 21, respectively.

The indicator device 11, which may be of various designs, includes a housing 23 having a pressure-responsive member or piston 25 slidably mounted therein. The surge control device 13 includes an outer body member 27 which defines an end wall for the indicator device 11 and which defines an annular frustoconical seat 29. The piston 25 has generally opposed faces 31 and 33 and a coil spring 35 normally biases the face 31 into sealing engagement with the seat 29. Thus, the piston 25 is of the differential area type with the effective area of the face 33 being greater than the effective area of face 31 when the latter is seated on the seat 29. When the piston 25 is spaced from the seat 29 an outer annular area 37 of the face 31 becomes exposed to the high-pressure fluid to thereby increase the effective area of the piston face 31. As seen in FIG. 2, the exterior surface of the piston 25 is spaced radially inwardly from the interior surface of the housing 23 to define an annular leakage passageway 39. Thus, when the piston 25 is spaced from the seat 29, high-pressure fluid may leak through the leakage passageway 39 into a low-pressure chamber 41 defined by the housing 23 and the face 33 of the piston 25. A port 43 permits this fluid to flow into the conduit 21 and from there into the conduit 17 at the low-pressure side of the filter 15.

The piston 25 carries a permanent magnet 45 which defines, in part, the face 33 of the piston. The housing 23 also has a wall 47 on one side of which a second magnet 49 is mounted for movement with a plunger or indicator means 51 which is urged toward the wall 47 by a spring 53. When the pressure differential across the filter 15 reaches a predetermined amount, referred to herein as the actuation pressure differential, the piston 25 is moved to the left as viewed in FIG. 1 until it abuts an annular shoulder 55 defined by the housing 23. At or before this time, a pole of the magnet 45 is brought sufficiently close to the corresponding pole of the magnet 49 to provide a repelling force sufficient to overcome the biasing force of the spring 53 and urge the indicator member 51 outwardly to the position shown in dashed lines in FIG. 1. Movement of the indicator member 51 to the outward position, may constitute a signal indicating that the filter 15 should be cleaned or replaced. Alternatively, the movement of the indicator member 51 to the outward position may be utilized to actuate a switch or other device which in turn provides a more easily recognizable indication of the condition of the filter 15.

In operation of the indicator device 11, assuming that the surge control device were not provided and the indicator is in the nonindicating position shown in full lines in FIG. 1, relatively high-pressure fluid would be supplied from the conduit 19 to the recessed portion of the face 31 of the piston 25. There would be relatively low-pressure fluid in the leakage passageway 39 and the chamber 41 and acting against the annular area 37 of the piston face 31. When the pressure differential across the indicator device 11 reached the actuation differential, the high-pressure fluid would move the piston 25 to the left as viewed in FIG. 1 off of the seat 29 to expose the annular area 37 of the face 31 to the relatively high-pressure fluid. The piston 25 would then be urged more forcefully to the left with such movement being retarded by the spring 35 and by the resistance of the fluid in the chamber 41 to exiting from the chamber 41. In the event that the actuation pressure differential were reached as a result of the pressure surge, movement of the piston 25 to the left would be sufficiently rapid to actuate the indicator prior to the time that the pressure surge subsides sufficiently to allow return movement of the piston 25. To overcome this problem, the surge control device 13 is provided.

With reference to FIGS. 2 and 3, it can be seen that the surge control device 13 is suitably mounted within an opening 57 in the end wall 27 of the indicator device 11. The surge control device may be mounted remotely from the indicator, if desired, if the surge control device is suitably mounted within a member similar to the wall 27. The surge control device 13 (FIG. 3) includes a body member 59 having a passageway 61 extending therethrough. The body member 59 defines an annular valve seat 63 intermediate the ends of the passageway 61 and a stop in the form of a plate 65 having an aperture 67 therein, is rigidly mounted on the body member 59 at the inlet end of the passageway 61. A groove 69 is formed in the exterior surface of the body member 59 and extends in spiral fashion between the opposite ends of the body member to define a capillary 71. It will be appreciated that the spiral configuration of the capillary 71 materially increases the length of the capillary as opposed to forming of the passageway straight through the body member 59 in the axial direction.

A valve element 73 is mounted for axial movement within the passageway 61. A knob 74 on the inlet end of the valve member 73 is biased into engagement with the plate 65 by a coil spring 75; however, such knob is exposed to fluid pressure so that the valve member is not a differential area valve. The valve member 73 has a valve surface 77 which is engageable with the valve seat 63 upon movement of the valve member 75 to the left as viewed in FIG. 3. The lateral periphery of the valve member 73 is spaced radially inwardly from the wall defining the passageway 61 to define a capillary 79 of generally annular configuration. In the embodiment illustrated, the cross-sectional area of the capillary 79 is considerably larger than the cross-sectional area of the capillary 71. The capillary 79 is completely closed when the valve member 75 is moved to place the valve surface 77 into engagement with the valve seat 63. As the surge control device 13 is capable of providing a restriction to fluid flow, the region between the device 13 and the member 25 may be considered as a third pressure zone.

In operation of the device shown in FIGS. 1–3, fluid from the high-pressure side of the filter 15 is supplied to the indicator device 11 via the conduit 19 and the capillaries 71 and 79. If the pressure drop across the filter 15 builds up gradually as will be the case when the filter becomes clogged, the piston 25 will move to the left off of the seat 29 when the pressure differential across the indicator device 11 and surge control device 13 reaches the actuation pressure differential. Such movement of the piston 25 off of the seat 29 causes a sudden rush of fluid through the capillaries 71 and 79 and a pressure drop at the rear face of the valve member 73. However, at normal actuation pressures, the spring 75 is sufficiently strong to prevent movement of the valve member 73 to the left. The capillaries 71 and 79 are sized so that at the actuation pressure the flow of fluid therethrough exceeds the flow through the leakage passageway 39 so that the piston will continue its movement to the left to actuate the indicator. Thus, for normal actuation of the indicator device 11, the surge control device 13 has no substantial effect on the operation of the indicator device 11.

A feature of the present invention is that the piston 25 will reseat on the seat 29 when the pressure differential is reduced to approximately 70 percent of the actuation pressure differential. At this point, the leakage through the leakage passageway 39 exceeds the flow through the capillaries 71 and 79 and the piston returns to its normal position against the seat 29 under the influence of the spring 35.

Assuming next that a surge condition results in a differential pressure across the surge control device 13 and the indicator device 11 which exceeds the normal actuation pressure differential, the piston 25 will be moved to the left as described above. This creates a sudden rush of fluid through the capillaries 71 and 79 and a differential pressure across the valve member 73. During the time that the differential pressure moves through the normal actuation range, the valve member 73 is held in the open position shown in FIG. 3 by the spring 75. However, as the differential pressure across the surge control device 13 and the indicator device 11 is increased beyond the normal actuation range, the pressure differential across the valve member 73 also increases sufficiently to overcome the force of the spring 75 to move the valve member from the open position shown in FIG. 3 to a closed position in which the valve surface 77 is seated on the valve seat 63 to close the capillary 79. At this time, the only fluid flowing through the surge control device 13 flows through the remaining open capillary 71.

The restriction afforded by the capillaries 71 and 79 can be selected to produce the result desired. For example, the restriction provided by the capillary 71 may be just sufficient to allow a greater quantity to flow therethrough than can flow through the leakage passageway 39 for the particular surge pressure so that the piston 25 will be moved further to the left by the fluid but at a much slower rate. The capillary 71 may also be constructed by varying the length and/or cross sectional area thereof so that at certain pressure differentials across the surge control device 13, the fluid flow therethrough will be less than the flow through the leakage passageway 39, and therefore, the piston 25 will be returned to its normal position against the seat 29 under the influence of the spring 35.

As the surge condition subsides, i.e., as the pressure differential across the indicator device 11 and surge control device 13 is reduced, the differential pressure across the valve member 73 drops to a level at which the spring 75 is operative to move the valve member to its open position shown in FIG. 3. As the pressure differential is reduced further to a value below the actuation pressure differential, the flow through the capillaries 71 and 79 will be less than the leakage through the leakage passageway 39 and the piston 25 will be returned to the seat 29. Of course, the length and cross-sectional area of the capillaries, the size of the various differential areas and the spring constant can be selected to produce the results desired.

FIG. 4 illustrates another embodiment of the invention which is functionally identical to the embodiment of FIG. 1. FIG. 4 illustrates an indicator device 81 which may be identical to the indicator device 11 and includes a piston 83 spring-biased against a seat 85 in the normal nonindicating position thereof. A surge control device 87 is interposed between the indicator device 81 and the high-pressure side of the filter 15. The surge control device includes capillaries 89 and 91 with the former being shorter and of greater cross sectional area than the latter. Specifically, the capillary 89 is defined by an annular space between a slidable valve member 93 and the interior surface of a body member 95 of the surge control device 87. The capillary 91 is in the form of a spiral groove on the exterior surface of the body member 95. The valve member 93 is movable to the right within the body member 95 to place a valve surface 97 into engagement with a valve seat 99 to close off the large capillary 89. The valve member 93, like the valve member 73, is not of the differential area type although a plug 101 thereof engages a central region of the valve member 93 in the open position thereof shown in FIG. 4. The operation of the embodiment of FIG. 4 is identical to that described above in connection with the embodiment of FIGS. 1–3.

FIGS. 5 and 6 show a surge control device 103 which is particularly adapted for obtaining relatively long delays for actuation of an indicator device 105 associated therewith. The indicator device 105 may be identical to the indicator device 11 and includes a piston 107 spring-biased against a seat 109 of the indicator device.

The surge control device 103 includes a body member 111 which may form the end wall for the indicator device 105. The body member 111 has passageway regions 113 and 115 therein with the region 113 being of lesser diameter and cross-sectional area than the region 115. The passageway regions 113 and 115 together define a passageway which extend substantially through the body member 111 in an axial direction. The body member 111 has a wall 117 having at least one aperture 119 therein and defining an annular valve seat 120. An apertured plate 121 is provided at the inlet end of the surge control device 103.

A valve member 123 is mounted for movement generally axially within the passageway regions 113 and 115 and is biased to the left into engagement with the apertured plate 121 by a spring 125. The valve member 123, which is not of the differential area type, has an annular valve surface 127 and has a protruding portion 129 which is normally biased into engagement with the apertured plate 121.

As best seen in FIG. 6, the valve member 123 has an exterior surface which is spaced inwardly from a surface 131 of the body member, which defines the passageway region 113 to define an annular capillary 133 which terminates at the large diameter passageway section 115. The exterior surface of the valve member 123 is provided with a spirally extending groove which defines a second capillary 135 which has a larger cross-sectional area than the capillary 133 and which terminates at the large diameter passageway 115. Preferably the cross sectional area of the capillary 133 is at a minimum to permit maximum control through the spiral capillary 135. Accordingly, the capillary 133 is just large enough in diameter to permit free sliding movement of the valve member 123. Although the capillaries 133 and 135 are in direct communication, they actually form two separate flow paths and for this reason can be considered as two capillaries rather than a single capillary of irregular cross section.

The cross sectional area of the capillary 135 decreases toward the inlet thereof. More particularly, the exterior surface of the valve member 123 is preferably parallel to the surface 131 and the reduction in cross-sectional area of the capillary 135 is preferably brought about by increasing the depth of the groove or capillary toward the outlet of such capillary. Thus, a flow passageway is provided from the high pressure side of the filter through the apertured plate 121, the passageway region 115, the capillaries 133 and 135, and the apertures 119 to the piston 107.

When surge conditions occur, the valve member 123 moves to the right for the reasons given above in connection with FIGS. 1–3 and several important operational effects may then be observed. FIrst, the length of both of the capillaries 133 and 135 is increased by movement of a greater portion of the valve member 123 into the relatively small diameter passageway section 113. That is, the passageway section 115 has a sufficiently large diameter so as to define, along with the valve member 123, a relatively large reservoir rather than an extension of the capillaries 133 and 135. Increasing the length of the capillaries increases the resistance to flow therethrough to thereby achieve increased time delay from the very moment that the valve member 123 begins its movement to the right.

Secondly, movement of the valve member 123 to the right progressively brings portions of the capillary 135 of progressively decreasing cross-sectional area into the passageway section 113. The effect of this is to reduce the cross-sectional area of at least the inlet portion of the capillary 135 to further restrict the flow of fluid therethrough to the piston 107.

Thus, with this embodiment of the invention the resistance to flow of fluid through the surge control device 103 103 is progressively increased as the surge pressure increases. Ultimately, the capillary 133 is at least substantially closed when the valve surface 127 moves a sufficient distance to the right to engage the valve seat 120; however, some leakage from the capillary 133 by the valve seat 120 may occur. Also, as shown in FIG. 6, the valve seat 120 has a radial dimension sufficient to partially close off the outlet of the capillary 135. At this instant the only fluid that flows through the capillary 133 is diverted into the capillary 135 so that the fluid flow through the surge control device 103 is limited by the capillary 135 which now has very substantial length and an inlet section and an outlet section of significantly restricted cross sectional area to thereby further increase the time delay for actuation of the indicator. In other respects, the operation of the embodiment of FIGS. 5 and 6 is identical to that described above in connection with the embodiments of FIGS. 1–3.

FIGS. 7 and 8 illustrate a surge control device 137 in which actuation of the indicator is prevented when the temperature drops below a predetermined value. In this embodiment of the invention, the indicator device may be identical to the indicator device 11 and have a piston 139. The surge control device includes body member 141, a valve member 143, which may be identical to the valve member 73 mounted for movement in the body member 141 and defining an annular capillary 145 therebetween. The valve member 143 is urged by a spring 147 against an apertured plate or stop 149. A capillary 151 of lesser cross-sectional area than the capillary 145 is defined by a spiral groove in the exterior surface of the body member 141 and the surrounding wall portion 153 of the indicator device.

Temperature compensating means in the form of a bimetallic temperature-responsive member 155 is mounted in a groove 157 of the body member 141. Segments 158 and 158a of the body member 141 define the groove 157. The bimetallic member 155 has a flat annular portion defining a valve seat 159. The bimetallic element 155 is arranged so that when the temperature drops below a predetermined level, the bimetallic element will deform to move the valve seat 159 to the left to the position shown in FIG. 8 in which it engages an annular valve surface 161 of the valve member 143 to close the annular relatively large capillary 145. This closing of the capillary 145 may occur without any movement of the valve member 143, if desired, and the capillary 151 may be appropriately sized so that when the temperature drops below a predetermined level and the capillary 145 is closed, actuation of the indicator is not possible. This is not harmful because such low-temperature conditions are ordinarily in existence only briefly during start up of the fluid system. This is a desirable feature when the indicator is used to sense the pressure differential across a filter assembly, since the indicator should only sense the pressure differential caused by increased dirt loading of the filter and should not indicate pressure differentials caused by increased fluid viscosities resulting from a reduction in the fluid temperature. It will be apparent that a temperature compensator such as the one described above can be provided in any of the above described embodiments of surge control devices.

Although exemplary embodiments of the invention have been shown and described, many changes, modifications, and substitutions may be made by one having ordinary skill in the art without necessarily departing from the spirit and scope of this invention.

I claim:

1. An apparatus connectable to a fluid system in which fluid at a relatively high pressure is supplied to a component of the fluid system and discharged therefrom at a relatively low pressure, said apparatus comprising:

an indicator device including a housing, a pressure-responsive member mounted for movement in said housing between first and second positions and resilient means for urging said pressure-responsive member toward said first position thereof, said pressure-responsive member having first and second generally opposed faces;

said housing defining a seat, said resilient means urging said first face of said pressure-responsive member into engagement with said seat, a portion of the area of said first face lying radially outwardly of said seat whereby the effective area of said first face is increased when said first face is moved out of engagement with said seat;

said indicator device including means defining a leakage passage extending from said first face to said second face of said pressure-responsive member;

said housing having an opening for providing communication between said second face of said pressure-responsive member and the low-pressure side of the component whereby the second face of said pressure responsive member is exposable to fluid at the relatively low pressure;

passage means for providing a flow path between said first face of said pressure responsive member and the high-pressure side of the component, said pressure-responsive member being movable by the relatively high-pressure fluid from said first portion toward said second position against the force of the resilient means in response to a pressure differential across the component of a first predetermined magnitude; and surge control means at least partially in said passage means responsive to predetermined pressure conditions for increasing the resistance to flow of the fluid through said surge control means to said first face of said pressure-responsive member without completely blocking flow of fluid through the surge control means whereby the movement of the pressure-responsive member to said second position is retarded.

2. An apparatus as set forth in claim 1 including temperature compensator means responsive to a decrease in temperature for increasing the resistance to the flow of fluid through said passage means.

3. An apparatus as set forth in claim 1 wherein said surge control means is mounted on said housing adjacent one end thereof.

4. An apparatus as set forth in claim 1 wherein said surge control means defines capillary passage means through which the high-pressure fluid flows to said first face of said pressure-responsive member, said surge control means including a body member having a passageway therethrough and a valve member movable in said passageway between an open position in which said capillary passage means is fully open and a restricted position in which said capillary passage means is at least partially closed, said surge control means including resilient means urging said valve member toward said open position, said valve member being exposed to the pressure of the fluid at approximately the inlet and the outlet of the capillary passage means whereby movement of the pressure-responsive member off of the seat to increase the effective area of the pressure-responsive member reduces the pressure at the outlet of said capillary passage means so that if the pressure at the inlet of the capillary is sufficient, the valve member will be moved to the restricted position thereof.

5. An apparatus connectable to a source of fluid at first and second pressure zones wherein the pressure at the first pressure zone may exceed the pressure at the second pressure zone, said apparatus comprising:

- an indicator device including a housing, a pressure-responsive piston in said housing movable between first and second positions, and yieldable means for urging said pressure-responsive piston to said first position, said pressure-responsive piston having first and second faces;
- said piston being spaced from the housing to define a fluid leakage path around said piston;
- first passage means for providing a fluid flow passage between the first pressure zone and the first face of the pressure-responsive piston of the indicator device whereby fluid from the first pressure zone can be supplied
- second passage means for providing a fluid flow passage between the second pressure zone and the second face of the pressure-responsive piston of the indicator device whereby fluid from the second pressure zone can be supplied to the indicator device;
- a surge control device at least partially in the first passage means intermediate the first pressure zone and the first face of the pressure-responsive member of the indicator device; and
- said surge control device including means defining first and second capillaries providing first and second flow paths, respectively, with said flow paths extending in parallel through said surge control device to said first face and pressure-responsive valve means for closing said first capillary.

6. An apparatus as defined in claim 5 wherein said valve means includes a valve seat and a valve member movable into engagement with said valve seat to close said first capillary, said apparatus including temperature compensator means responsive to the temperature of the fluid reaching a predetermined relatively low value for moving said valve seat into engagement with said valve member to close said first capillary independently of the pressure differential across the apparatus.

7. An apparatus as set forth in claim 5 wherein said surge control device includes a body member mounted in said first passage means and having a passageway extending therethrough, a valve member in said passageway, said first capillary being defined by a clearance space between said valve member and the wall of the passageway, said valve member being movable in said passageway between an open position in which said first capillary is open to allow fluid flow therethrough and a closed position in which said first capillary is at least substantially closed by said valve member, said valve member having an axially and circumferentially extending groove on the exterior surface thereof which defines said second capillary.

8. An apparatus as defined in claim 7 wherein the wall of the passageway has a first region which is closely adjacent the valve member to define the first capillary and a second region which is spaced a greater distance from the valve member to define a chamber, said valve member moving progressively into the portion of the passageway defined by said first region in moving toward said closed position to progressively increase the lengths of said capillaries.

9. An apparatus as defined in claim 8 wherein said groove in said valve member is of greater cross-sectional area adjacent the outlet thereof than adjacent the inlet whereby the inlet of said second capillary is at least substantially progressively restricted as said valve member moves toward the closed position.

* * * * *